United States Patent Office 3,340,028
Patented Sept. 5, 1967

3,340,028
HIGH-TIN TITANIUM WELDING WIRE
Milton B. Vordahl, Las Vegas, Nev., assignor to Crucible Steel Company of America, Pittsburgh, Pa., a corporation of New Jersey
No Drawing. Original application July 17, 1964, Ser. No. 383,487, now Patent No. 3,302,282, dated Feb. 7, 1967. Divided and this application Nov. 30, 1966, Ser. No. 597,846
3 Claims. (Cl. 29—198)

ABSTRACT OF THE DISCLOSURE

This invention relates to weldments of titanium and base alloys thereof, and in particular to weldments made with the use of a high-tin titanium-base alloy. In addition this invention relates to welding wire made of a high-tin titanium-base alloy for use in making such weldments. More specifically, the invention contemplates the use of a titanium-base alloy containing tin in an amount up to about 20% by weight and preferably within the range 13 to 18% by weight with the optimum tin content being about 15% by weight. Tin is used because of its characteristic as a potent inhibitor of beta decomposition and because it is widely soluble in both alpha and beta titanium. Consequently, in welding applications, it acts to prevent embrittlement ordinarily caused by beta decomposition.

---

This application is a division of my earlier-filed copending application Ser. No. 383,487, filed July 17, 1964, now Patent No. 3,302,282, which is in turn a continuation-in-part of my earlier-filed copending application Ser. No. 130,494, filed Aug. 10, 1961, now abandoned.

In the process of fabricating metal structures by joining standard shapes, welding is probably the most widely used of the joining operations. In the case of fusion welding, the more common methods of welding, weld or filler metal is often employed, and the base metal, i.e., the metal being welded, is heated to temperatures well above its melting point and is invariably melted in the immediate vicinity of the joint. As a result of the temperatures attained in the base metal, important changes may occur therein. In this regard, cooling rate and maximum temperature are of extreme importance, especially in connection with titanium, titanium-base alloys, and other metals undergoing transformation of phases. For example, where a base metal has been intentionally hardened by cold working prior to welding, an undesirable loss in strength may be occasioned should the work be heated above a critical temperature range. The detriment is most pronounced in those portions of the base metal adjacent to the joint, since such portions are more prone to be heated to the critical temperature range and thereby undergo recrystallization. Where the heat is sufficiently intense to raise the temperature above this range, grain growth occurs. The cooling rate, of course, is significant in the obtention of a stable and ductile weld and is dependent upon the composition of the weld metal.

Since the ability to make a ductile fusion joint of a given metal is often of significant or even of controlling importance in determining the usefulness of the metal, it follows that in such cases as titanium and titanium-base alloys, where hot-strength properties are outstanding for such vital applications as missiles and aircraft, the hot-strength properties will be of little consequence in many cases unless ductile welds are obtainable.

In the consideration of the weldability of titanium and titanium-base alloys, a discussion of crystal mechanics is in order, and in this connection the common crystallographic classification may be employed, i.e., alpha, beta, and combined alpha-beta. Fundamentally, titanium undergoes a crystallographic transformation from hexagonal alpha to body-centered beta at about 1625° F., and increasing amounts of many of its common alloying elements progressively drop the lowest temperature at which the crystal structure is entirely body-centered until, finally, it possesses that structure at well below room temperature. Of the crystallographic types, alpha alloys, including commercial titanium, exhibit relatively poor bend ductility and a weld ductility which is comparable to that of the alpha base metal, while beta alloys (heat-treatable and not heat-treatable) exhibit relatively high bend ductility and excellent weld ductility. Combined alpha-beta alloys exhibit a compromise performance reflecting, roughly, the proportions of alpha and beta present, i.e., the more beta present, the better the bend performance. Unfortunately, combined alpha-beta alloys have a weld ductility even poorer than that of alpha alloys.

In addition to the crystal mechanics heretofore discussed, it is important to note the effect of specific alloying elements. Alpha stabilizers promote or stabilize the alpha form over a wider temperature range, i.e., they raise the transformation temperature range, whereas beta stabilizers stabilize the beta form over a wider temperature range, i.e., they lower the transformation temperature range. Where very large additions of beta stabilizers are made to titanium, a completely stable beta alloy results, i.e., an alloy having an entirely beta crystal structure which will not transform, regardless of thermal and mechanical treatment, between room temperature and the melting point. Between the very large beta-stabilizing additions of the stable beta and the medium additions of the combined alpha-beta alloys is a region in which the alloys quite readily retain the beta structure in an unstable form, even on air cooling. Thus, beta alloys can be classified as either heat-treatable (unstable) or non-heat-treatable (stable). With unstable beta alloys, aging for several hours to several days at temperatures in the range of 300 to 800° F. permits some unstable beta to transform, and this transformation is often accompanied by embrittlement. This embrittlement, with some uncertainty, has been attributed to the formation of a transitory omega phase. Overaging, however, results in disappearance of the omega phase and obtention of a structure exhibiting maximum ductility and stability and containing stable beta and alpha.

From the foregoing it would appear that weld ductility of combined alpha-beta alloys would be impaired by the addition of alpha stabilizers, since said alloys would tend to behave more like all-alpha alloys, i.e., exhibit relatively poor weld ductility. It would also appear that the addition to such alpha-beta alloys of beta stabilizers would in many cases result in embrittlement, since the tendency would be to retain the beta structure in an unstable form that would transform during aging. That this is indeed the case is borne out by the long-standing problems of avoiding embrittlement and obtaining useful ductility in titanium weldments.

Accordingly, it is a principal object of the present invention to provide a method of welding for producing a weld which remains substantially free from embrittlement on aging.

Another object of the invention is to provide a method of welding for producing a weld which can be overaged to useful ductility.

A further object of the invention is to provide a method of welding titanium and titanium-base alloys employing a tin-containing titanium-base alloy weld metal for producing a weld which is relatively ductile and tough and remains substantially free from embrittlement on aging.

Yet another object of the invention is to provide a weldment comprising an assembly wherein component parts are joined with a tin-containing titanium base alloy weld metal, the resultant weld being relatively ductile and tough and free from embrittlement on aging.

Other objects of the invention will be obvious from the following description.

The present invention contemplates the use of a titanium-base alloy containing tin, e.g., up to about 20% by weight, as a weld or filler metal, particularly for use in the fusion welding of titanium and titanium-base alloys. The amount of tin employed in the weld metal should be at least effective to accomplish the desired results of rendering the resultant weld relatively ductile and tough and free from embrittlement on aging. The maximum tin employed is dictated by approaching that value beyond which other physical properties are significantly impaired. A preferred range of about 13 to 18% tin by weight, and an optimum value of about 15% tin by weight was determined. The selection of tin as an alloying element was based on the finding that tin is a potent inhibitor of beta decomposition and is widely soluble in both alpha and beta titanium. Hence, no degree of dilution with the base produces an intrinsically brittle composition. The reason therefor is that the effect of dilution by the titanium, i.e., accelerated aging, is canceled out by the effect of dilution by the tin, i.e., retarded aging. Where there is dilution by the weld metal of a base metal containing a high proportion of beta phase, the sluggishness conferred by the tin on the decomposition of beta slows aging of the resultant weld metal and avoids embrittlement by the base aging cycle. On the other hand, where there is dilution by the weld metal of a base metal containing a low proportion of beta phase, the resultant weld metal does not age to embrittlement by any cycle, i.e., aging effects are not readily detectable or, alternatively, overaging to a useful ductility occurs.

In the course of the investigation leading to the instant invention, coupons of beta titanium (13% V, 11% Cr, 3% Al) were welded transversely with a weld metal comprising a tin-containing titanium-base alloy (about 14% Sn, balance Ti). The coupons were then aged (about 8 hours at 900° F.) and tensile-tested. All coupons failed in the weld metal with excellent ductility and exhibited an average tensile strength of about 120,000 p.s.i., which value is high enough for broad usefulness.

It will be understood that the invention relates to a process of welding wherein there may be applied to an assembly of pieces to be welded at least one weld-effecting physical influence, i.e., heat or pressure. Alternatively, the high-tin welding wire may be first fused and then applied to the joint in the molten state.

Although the invention has been described in connection with a certain specific embodiment, it will be readily apparent to those skilled in the art that various changes can be made to suit requirements without departing from the spirit and scope of the invention.

I claim:

1. A weldment comprising an assembly wherein component parts of a titanium-base alloy wherein at least a portion of the microstructure thereof is beta are joined with a weld metal consisting essentially of a tin-containing titanium base alloy, the amount of tin ranging from an amount effective to produce a relatively ductile weld metal free from embrittlement on aging to about 20% by weight.

2. A weldment as in claim 1 wherein the amount of tin is within the range of 13 to 18% by weight.

3. A weldment as in claim 1 wherein the amount of tin is about 15% by weight.

References Cited

UNITED STATES PATENTS

| | | | |
|---|---|---|---|
| 2,669,514 | 2/1954 | Finlay et al. | 75—175.5 |
| 2,902,755 | 9/1959 | Salt et al. | 29—504 X |
| 2,906,008 | 9/1959 | Boegehold et al. | 29—504 X |

FOREIGN PATENTS 785,293  10/1957  Great Britain.

OTHER REFERENCES

Journal of Metals, January 1954, pages 25–29 relied on.

CHARLES N. LOVELL, *Primary Examiner.*

DAVID L. RECK, *Examiner.*